United States Patent [19]

Colevas

[11] Patent Number: 4,904,848
[45] Date of Patent: Feb. 27, 1990

[54] PORTABLE COOLING AND HEATING DEVICE

[76] Inventor: Geraldean Colevas, 2812 Oakton Manor Ct., Oakton, Va. 22124

[21] Appl. No.: 307,469

[22] Filed: Feb. 8, 1989

[51] Int. Cl.[4] ............................................ A47J 36/26
[52] U.S. Cl. ..................................... 219/387; 219/521
[58] Field of Search ............... 219/385, 386, 387, 521, 219/454, 218

[56] References Cited

U.S. PATENT DOCUMENTS

| | | | |
|---|---|---|---|
| 1,979,222 | 10/1934 | Goodwin | 219/218 |
| 2,543,524 | 2/1951 | De Oliveira | 219/387 |
| 2,585,310 | 2/1952 | Gronlund | 219/387 |
| 3,482,078 | 12/1969 | Milne | 219/387 |
| 3,586,099 | 6/1971 | Collie | 219/218 |
| 3,808,401 | 4/1974 | Wright | 219/387 |
| 3,869,595 | 3/1975 | Collins | 219/387 |
| 4,206,343 | 6/1980 | Mousel | 219/387 |
| 4,543,471 | 9/1985 | Anderson | 219/387 |
| 4,650,968 | 3/1987 | Williams | 219/385 |

*Primary Examiner*—Teresa J. Walberg
*Attorney, Agent, or Firm*—Sixbey, Friedman, Leedom & Ferguson

[57] ABSTRACT

A portable cooling and heating device for cooling and heating foods placed therein is provided including a housing having a bottom wall, a top, a front wall, a rear wall, and side walls. A heating element for heating the foods and a removable cooling element for cooling the foods are positioned in a support which is insertable into and removable from the housing for positioning both the heating element and the cooling element adjacent the food. The heating element being mounted in the support and the cooling element being supported by the support for maintaining an interior of the housing cool prior to heating of the food.

25 Claims, 6 Drawing Sheets

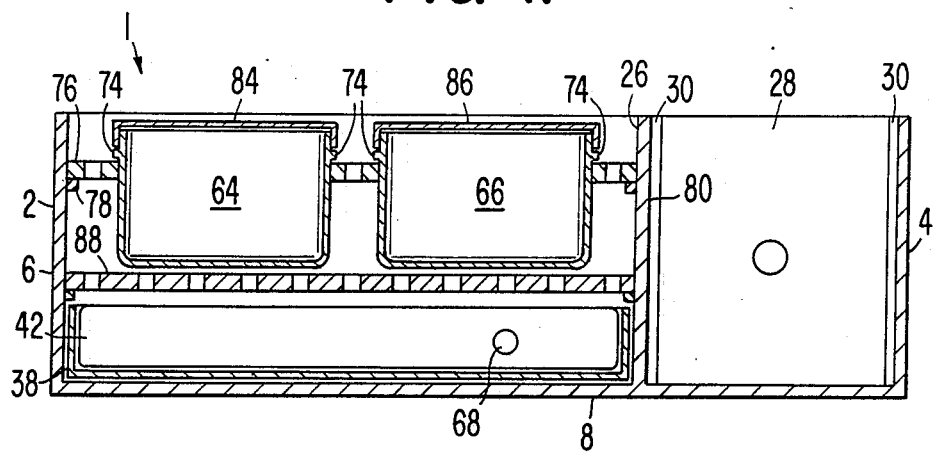
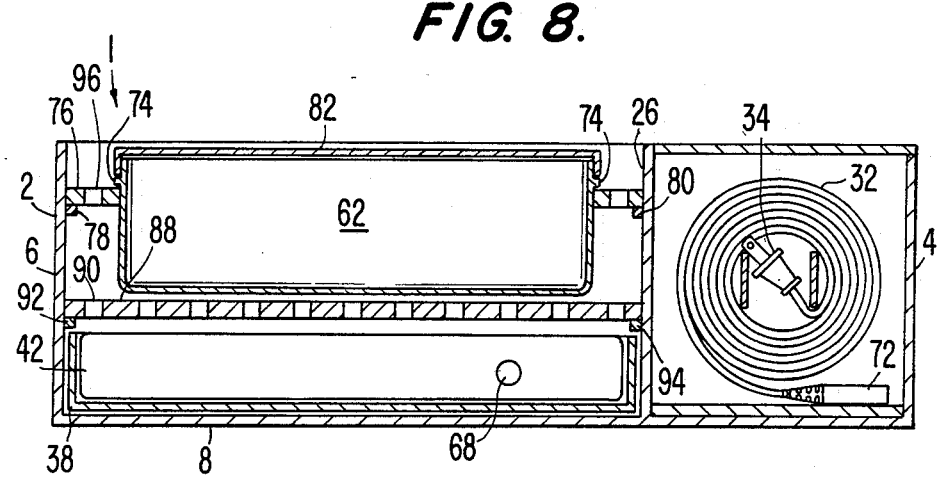

PORTABLE COOLING AND HEATING DEVICE

TECHNICAL FIELD

This invention relates to a portable cooling and heating device, and more particularly, to a lunch box wherein the contents may be kept cooled and when desired, steam heated prior to consumption.

BACKGROUND OF THE INVENTION

Heated lunch boxes of the abovementioned type are generally known in the art. Examples of such are shown in U.S. Pat. Nos. 3,482,078 to Milne and 3,869,595 to Collins et al. Each of these patents provide a lunch box with a heating element therein for heating the contents of the container when desired. Each of the abovementioned patents disclose a portable lunch box wherein heating elements are provided for heating a fluid such as water thereby creating a vapor for heating the food positioned within a tray. It should be noted however, that with the abovementioned lunch box the food contained therein is positioned in a single tray or compartment such that only food which is to be heated can be placed in these trays. Further, the food within the lunch box is not subjected to any cooling while placed therein and depending upon the particular food, this food may spoil prior to its consumption by the user. Further, in the lunch box of U.S. Pat. No. 3,482,078 extensive seals must be provided between the chamber containing the liquid and the rest of the lunch box, such that none of this fluid is lost during transportation of the box. As to the lunch box illustrated by U.S. Pat. No. 3,869,595, vents are provided for venting the vapor during use of the box. Therefore, the water contained in the lower portion of the lunch box can only be applied thereto when the box is ready for use. Otherwise, if the box were to be upset during its lunch box water would leak from the vents provided in the upper portion of the lower chamber.

In an attempt to solve the aforementioned problems, U.S. Pat. No. 4,630,671 issued to Sherman et al. discloses lunch box body having a vessel mounted therein which is filled with a freezable liquid to cool the interior of the lunch box prior to its use. However, this vessel is permanently mounted on a cover portion of the lunch box and therefore must always be carried with the lunch box in either the frozen or unfrozen state, thereby unnecessarily adding to the overall weight of the lunch box. Further, the food to be heated in the lunch box of this type is merely placed in the heated chamber 4 which is directly heated by the heating element. Such direct contact between the food and the heating element is often undesirable in that the portion of the food closest to the heating element will heat the fastest while leaving other portions of the food unheated or a portion of the food closest to the heating element may become burned prior to the sufficient heating of the portion of food away from the heating element.

Clearly, there is an outstanding need for an improved lunch box wherein the food is conveniently contained in individual containers and may be steam heated when desired by the user. Further, there is a need for a lunch box which can be selectively cooled, with the cooling medium being ultimately used as the source of steam for heating the food contained therein.

SUMMARY OF THE INVENTION

In view of the foregoing, it is an object of the present invention to provide a portable cooling and heating device for heating food contained therein.

Another object of the present invention is to provide a portable cooling and heating device wherein the food contained therein may be kept in a cool atmosphere prior to the selective steam heating of the food contained therein by the user.

It is yet another object of the present invention to provide a drawer within the portable cooling and heating device which contains the heating element as well as an ice pack for maintaining the interior of the box cool prior to the desired heating period. And further, to provide an ice pack wherein the fluid contained therein is further used as the source for steam for heating the food within the device.

Another object of the present invention is to provide a plurality of individual containers being supported within the portable cooling and heating device such that these containers can be individually and readily placed in and removed from the device.

These as well as other objects are achieved in accordance with the present invention by providing a portable cooling and heating device for cooling and heating foods placed therein comprising a housing having a bottom wall, side walls and a top wall hingedly connected to one of the side walls, a cooling means for cooling the interior of the housing, and a heating means for heating the interior of the housing. Both the cooling means and heating means being provided in an accommodating means within the housing such that both the cooling means and the heating means may be detachably retained within this housing.

These as well as numerous other advantages of the invention will become apparent from the figures in the following description of the preferred embodiment.

BRIEF DESCRIPTION OF THE DRAWINGS

FIG. 7 is a cross-sectional view of the portable cooling and heating device taken along line VII—VII of FIG. 2; and FIG. 8 is a cross-sectional view of the portable cooling and heating device taken along line VIII—VIII of FIG. 2.

DETAILED DESCRIPTION OF THE PREFERRED EMBODIMENT

Figure 1:
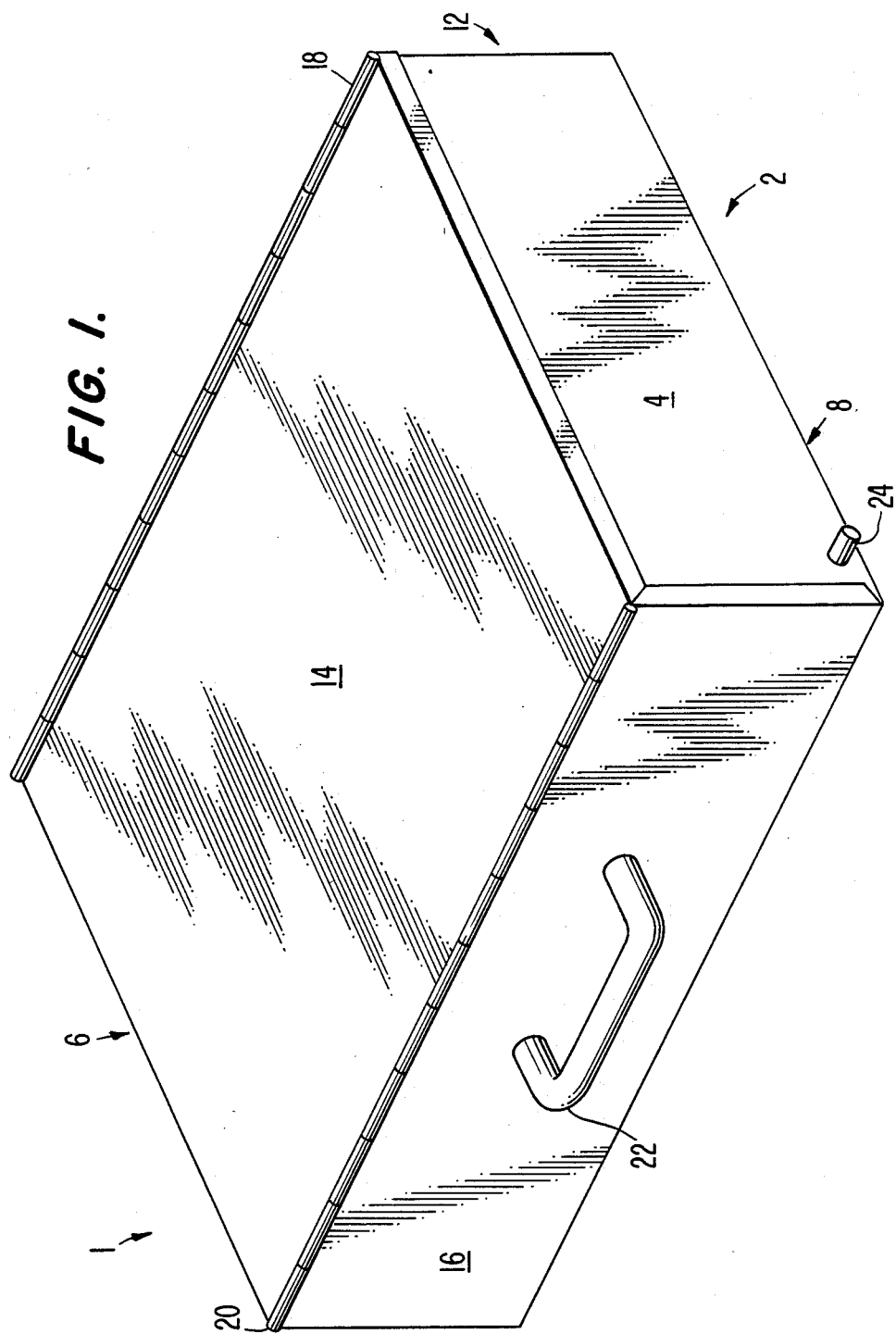
FIG. 1 is a perspective view of the portable cooling and heating device in accordance with a preferred embodiment of the invention.

FIG. 1 illustrates the portable cooling and heating device 1 which is composed of a housing 2 which includes side walls 4 and 6, bottom wall 8, front wall 10 and rear wall 12. A two-piece closure 14, 16 is hingedly connected to the rear wall 12 by way of hinge 18. The closure is formed of two pieces 14 and 16 with the two pieces being hingedly connected to one another by way of hinge 20. The purpose for such a two-piece construction will be set forth in further detail below; however, the construction of the closure may be in the form of a single closure 14. The front plate closure 16 of the closure is provided with a handle 22 so as to aid in the handling of the device. The handle as illustrated may be fixed in the extended position or collapsible, and may also be provided on the top plate closure 14 if desired. Further, if only a single top plate construction is used, the handle 22 may be secured directly to the front wall 10.

A pin and groove lock 24 is illustrated wherein a pin extendable into the box will contact a groove or hole formed in the closure; however, any latching mechanism may be utilized in connection with the preferred embodiment which will fixedly connect the frontal closure plate 16 to the housing 2 such that the handle 22 may be grasped to easily transport the device 1 without the danger of the closure wall opening.

Figure 2:
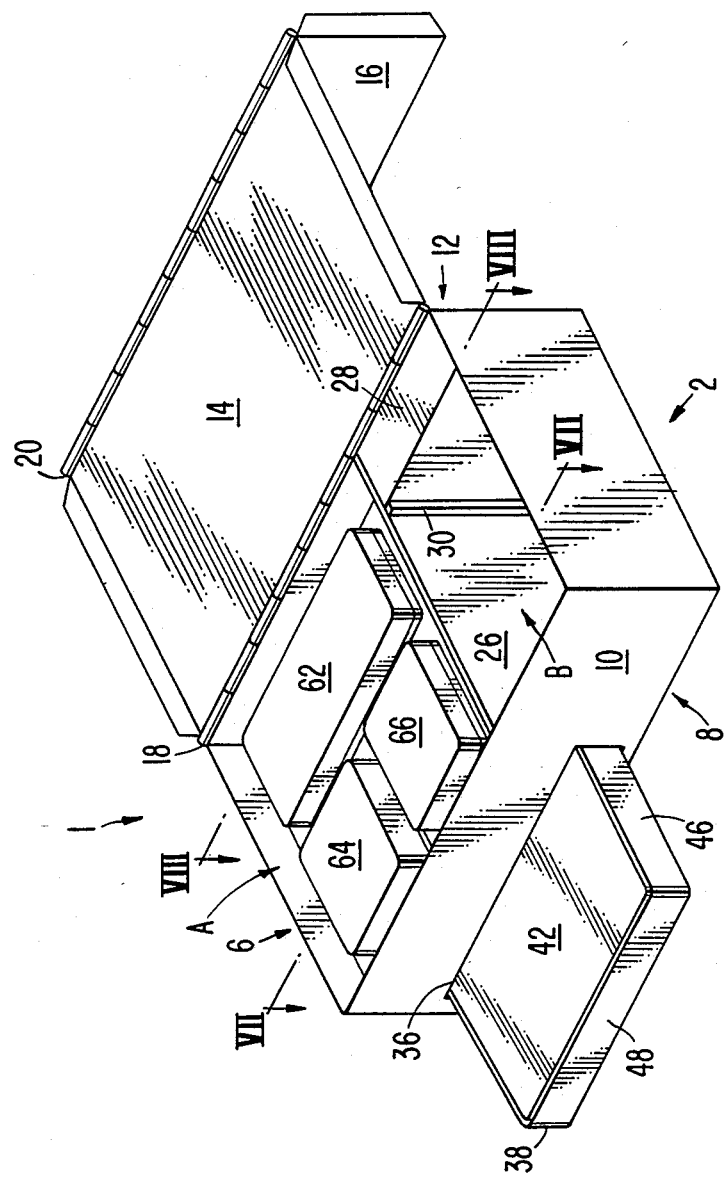
FIG. 2 is a perspective view of the portable cooling and heating device in the open position in accordance with a preferred embodiment of the invention.
Figure 3:
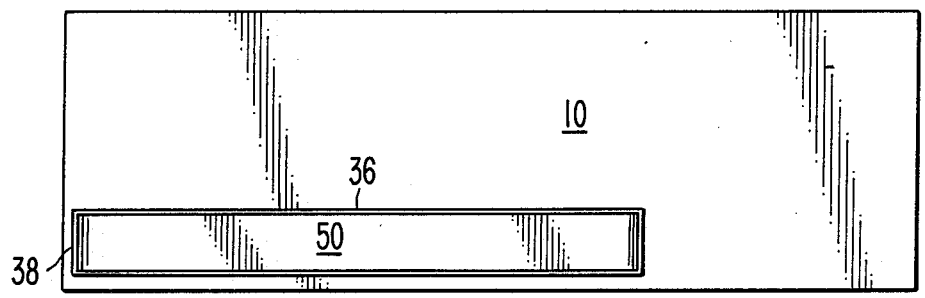
FIG. 3 is an elevational view of the housing of the portable cooling and heating device with the top closure removed.

As may become readily apparent from FIG. 2, the closure wall, when in the open condition, may be positioned such that the top closure wall 14 forms a tabletop-type surface which may serve as a clean surface for preparing and serving the food. Also, due to the two-piece construction of the closure, the front plate closure 16 may be used to support the top closure wall 14 when in the open condition, with the two pieces being locked at essentially right angles to one another. If, however, a single top closure wall construction is to be utilized, an extendable support bracket would need to be provided to support the top closure wall 14.

The portable cooling and heating device is composed of essentially two compartments which are divided by way of the partition wall 26. This partition wall 26, just as walls 4 through 12 and closure 14, 16, may be formed of a thermal insulating material. Compartment A, which contains the cooling and heating elements as well as the food containers composes a majority of the interior of the housing 2. The elements of compartment A will be discussed in further detail below. Compartment B, includes an open cavity for storing utensils, fruit, a beverage, or any other product which does not require a separate container. This compartment may also be used for waste material during use of the device. Additionally, a casing 28 is slidably received within the compartment B between the rear wall 12 and the bracket 30. This casing 28 is provided for housing the cord 32 which is adaptable to an AC power source by way of plug 34 as may best be seen in FIG. 8. It should be understood that while the Figures disclose a cord 32 having a plug 34 of the type which is adaptable to an AC power source from, for example, an ordinary household power supply, or the heating and cooling device may be powered by way of a low voltage, direct current, such as batteries or the cigarette lighter of an automobile and therefore the casing 28 would house an adapter appropriate for such use.

Figure 4:
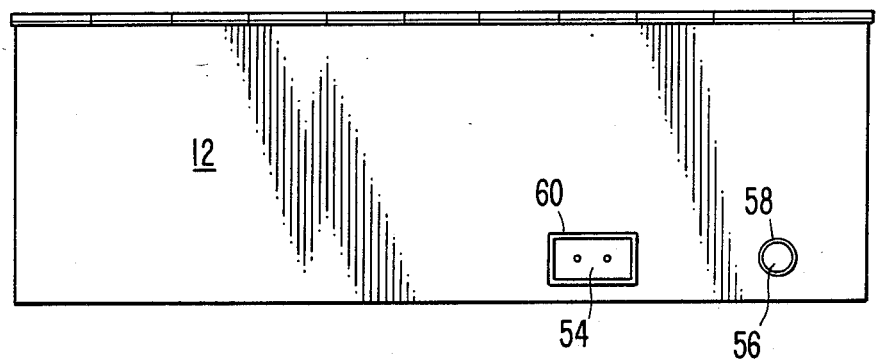
FIG. 4 is an elevational view of the back of the housing of the portable cooling and heating device in accordance with the present invention.
Figure 6:
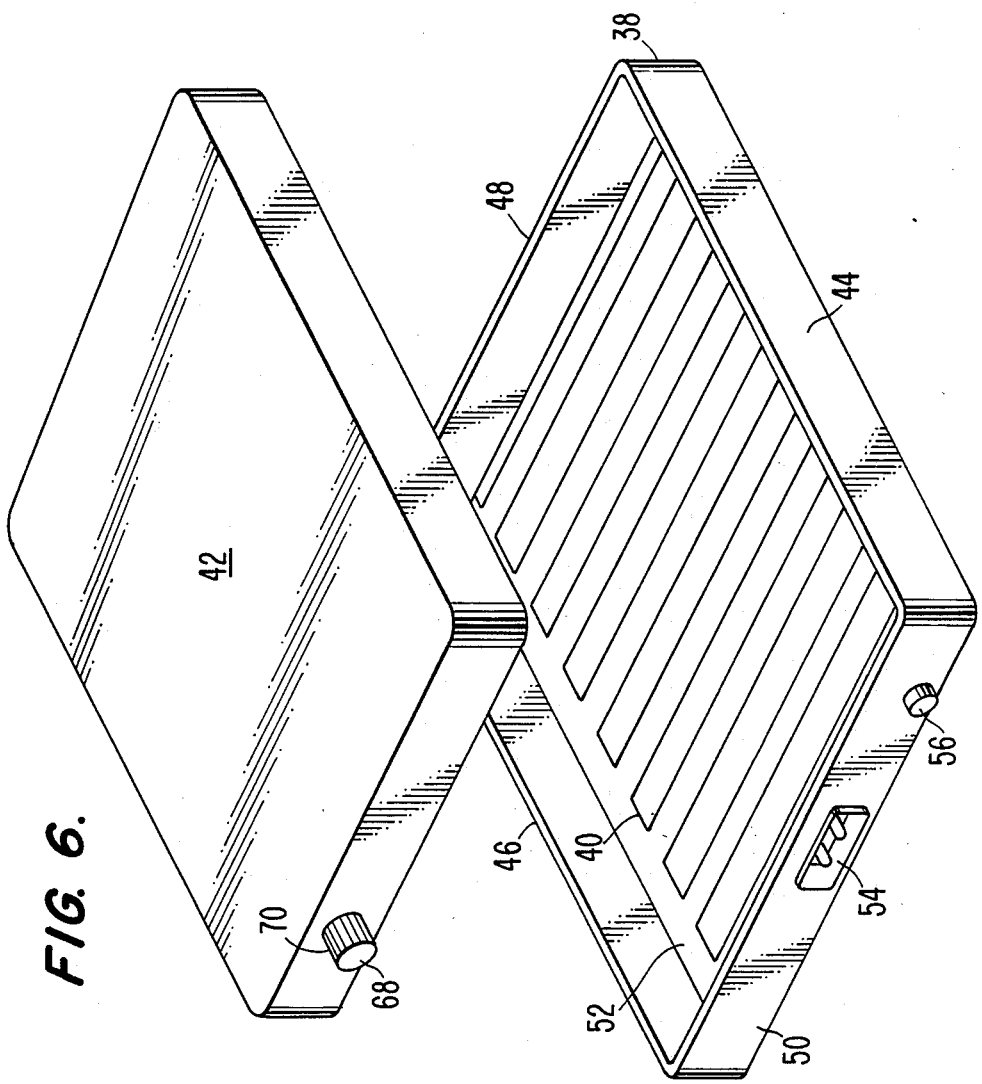
FIG. 6 is a perspective view of the drawer which accommodates the cooling and heating elements which is detachably retained within the portable cooling and heating device in accordance with the present invention.

As can be seen in FIG. 2, the front wall 10 is provided with an opening 36 for accommodating a drawer 38 which includes the heating elements 40 and the cooling pack 42. The drawer 38, as is best seen in FIG. 6, is formed of side walls 44 and 46, front wall 48, rear wall 50 and bottom wall 52. When the drawer 38 is in the fully closed position, the front wall 48 of the drawer 38 is co-planar with the front wall 10 of the housing 2. The bottom wall 52 is provided with the heating element 40 therein. This heating element 40 may be of the foil tape type being electronically insulated but not thermally insulated such that when connected to a power source the heating element will heat a fluid such as water provided in the drawer 38 to create steam for heating the food within the device. The heating element 40 is electrically connected to the male plug 54 which is provided in the rear wall 50 of the drawer 38. This male plug 54 can be connected to the female end 72 of the cord 32 and thereby connected to a power source. The drawer 38 is further provided with a button 56 which extends through the opening 58 in the rear wall 12 of the housing 2 when the drawer is in the fully closed position as can be seen in FIG. 4. Also as shown in FIG. 4, the male plug 54 extends through a similar opening 60 when the drawer 38 is in the fully closed position to allow the female portion 72 of the cord to be connected thereto. The button 56 allows for the drawer to be nudged open by the user from the rear wall such that the drawer may be easily accessible from the front side of the housing and readily slid out of the housing 2.

As is shown in FIG. 2, the cooling pack 42 when in the operable position is placed within the drawer 38 such that the cooling pack 42 may be positioned below receptacles 62, 64 and 66. The cooling pack 42 may be formed of a freezable thermoplastic material having a capped opening 68, such that the cooling pack 42 may be filled with water, placed within a freezer, and frozen such that the cooling pack 42 will maintain the interior of the housing 2 cool when positioned within this housing. Over time, the ice within the cooling pack 42 will melt and subsequently this water may be used as the heating medium within the drawer 38. To do so, the closure 70 is removed and the contents of the cooling pack 42 poured into the drawer 38. Once the drawer 38 is connected to an electrical power source, the heating element 40 will become energized and heat the water creating steam for heating the interior of the housing 2. By permitting the use of the cooling medium as the heating medium as well, the device may be used when away from a water source such as when at a construction site or a roadside rest area.

As can be seen from the Figures, the cooling and heating device is adapted to receive three receptables 62, 64, and 66 in such a manner that these receptables may be individually removed from and placed into compartment A of the device. Each of the receptacles 62, 64, and 66 include a food receiving portion having a bottom wall and side walls with the side walls having a flange 74 extending there around about the periphery of the receptacle. These flanges 74 are provided for contacting the rack 76 provided within the compartment A for supporting the receptacles within the compartment A. As is shown in FIGS. 7 and 8, the rack 76 is supported within the housing 2 by brackets 78 and 80 which are securely mounted to the side wall 6 and the partition 26, respectively.

Figure 5:
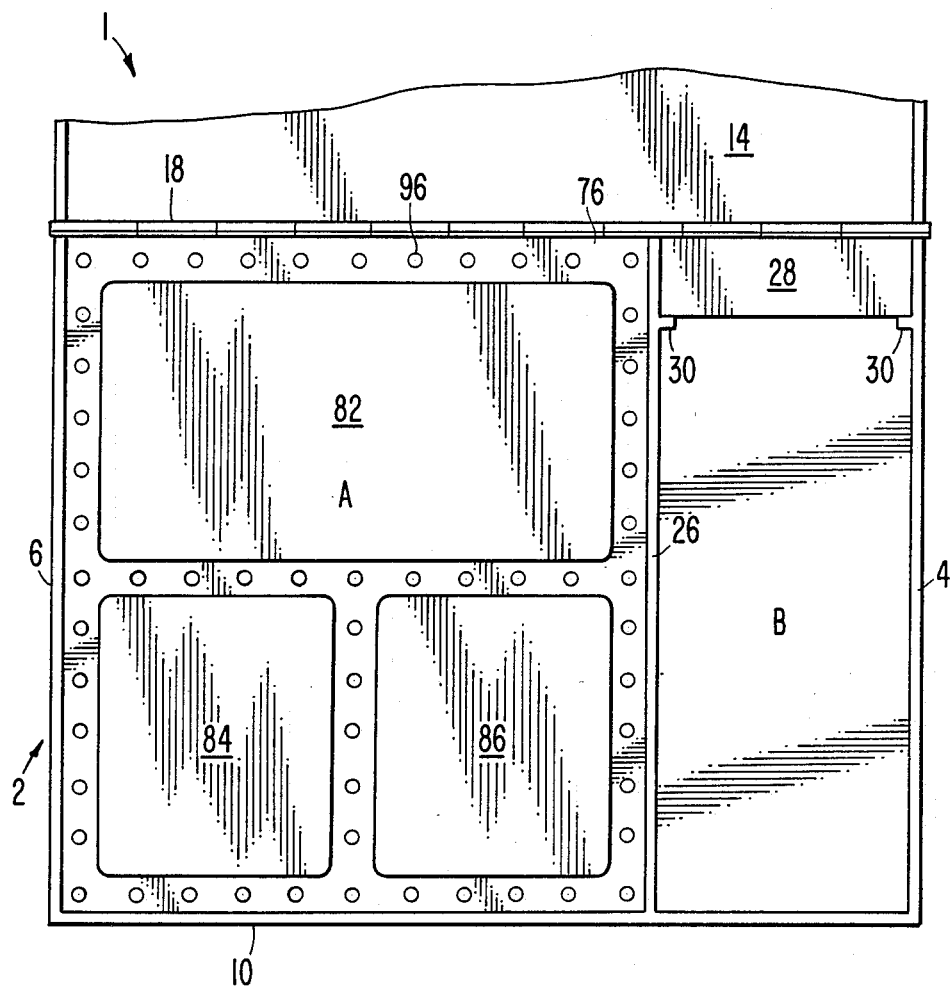
FIG. 5 is a top view of the interior of the portable cooling and heating device in accordance with the present invention.

Each of the receptacles 62, 64, and 66 include a lid 82, 84, and 86, respectively. These containers are individually and removably mounted within the housing such that the containers may be filled with food and placed within a refrigerator and then selected by the user from the refrigerator and placed within the housing 2 of the cooling and heating device 1 for use later in the day. Further, by providing individual receptacles a food such as pudding or fruit, which is not desired to be heated, may be removed from the device prior to the heating of the other food within the housing. Compartment A is additionally provided with a perforated plate 88 which includes a plurality of perforations 90 therein. The plate 88 is supported within the housing in a similar manner as that of the rack 76, by brackets 92 and 94. Similarly, perforations 96 are provided within the rack 76 such that when steam is created in a lower portion of the compartment A, this steam is allowed to circulate throughout the compartment and encapsulate the receptacles 62, 64, and 66 so as to aid in the heating of the food therein. The perforations 96 may be better seen in FIG. 5.

By providing individual sealed containers, which are both freezer and dishwasher safe, a large number of containers may be prepared at the beginning of a week and stored in the refrigerator or freezer. Then, each day the user may select from these containers for that day and place them within the device 1, thereby making the device 1 simple and efficient to use.

While the invention has been described with reference to a preferred embodiment, it should be appreciated by those skilled in the art that the invention may be practiced otherwise than as specifically described herein without departing from the spirit and scope of the invention. It is therefore, to be understood that the spirit and scope of the invention be limited only by the appended claims.

What is claimed is:

1. A portable cooling and heating device for cooling and heating foods placed therein comprising:
    a housing having a bottom wall, a top wall, a front wall, a rear wall, and side walls;
    a heating means for heating said foods;
    a removable cooling means for cooling said foods; and
    a positioning means insertable into said housing for positioning both said heating means and said cooling means adjacent said foods, said heating means being mounted in said positioning means and said cooling means being supported by said positioning means for maintaining an interior of said housing cool prior to heating of said foods.

2. The device as defined in claim 1, further comprising a rack supported within said housing for receiving at least one food receptacle.

3. The device as defined in claim 2, wherein said rack supports a plurality of food receptacles.

4. The device as defined in claim 1, wherein said positioning means is a drawer which is slidable into and out of an opening formed in said housing.

5. The device as defined in claim 4, wherein said opening is in said front wall.

6. The device as defined in claim 5, wherein said housing is divided into first and second compartments by a partition wall extending from said front wall to said rear wall.

7. The device as defined in claim 6, wherein said opening is in a lower portion of said front wall and said drawer extends into the first of said compartments.

8. The device as defined in claim 7, further comprising a rack supported within said first compartment for receiving at least one food receptacle.

9. The device as defined in claim 8, wherein said drawer is slidable into a position below said food receptacle within said first compartment.

10. The device as defined in claim 9, further comprising a plate supported within said housing and positioned between said drawer and said food receptacle, wherein said plate includes a plurality of perforations which allows steam to circulate within said first compartment.

11. The device as defined in claim 10, wherein said rack includes a plurality of perforations to further allow steam to circulate within said first compartment.

12. The device as defined in claim 4, wherein said heating means is an electrically insulated heating foil and is mounted on an inner surface of a bottom wall of said drawer.

13. The device as defined in claim 12, wherein said drawer includes a means for connecting said heating foil to a power source.

14. The device as defined in claim 13, wherein said means for connecting said heat foil to a power source includes said male plug which extends from a rear wall of said drawer and is accessible through an opening in said rear wall of said housing when said drawer is in a fully inserted position.

15. The device as defined in claim 4, wherein said cooling means is a freezable ice pack and is positioned in said drawer for maintaining the interior of said housing cool.

16. The device as defined in claim 15, wherein said ice pack is filled with water, with the water being selectively placed in said drawer for steam heating said food in said receptacles.

17. The device as defined in claim 5, wherein said top wall includes first and second sections hingedly connected to one another, said first section covering a top of said housing and said second section covering said front wall and said opening when said top wall is in a closed condition.

18. The device as defined in claim 17, wherein at least said first section include a smooth inner surface for forming a tabletop when said top wall is in an open condition.

19. The device as defined in claim 18, wherein said second section supports said first section in an essentially horizontal position when said top wall is in said open condition.

20. The device as defined in claim 17, wherein at least one of said sections includes a handle hingedly connected to an outer surface thereof.

21. A portable cooling and heating device for cooling and heating food contained in individual receptacles comprising;
    a housing having a bottom wall, front wall, rear wall and side walls;
    a top closure wall hingedly connected to said rear wall and pivotable between an open and closed position;
    a drawer slidably insertable into a first opening in said housing;
    a heating means mounted on a bottom wall of said drawer including a means for connecting said heating means to a power source, said means for connecting being accessible through a second opening in said housing;

a removable cooling means positioned within said drawer for maintaining the interior of said housing cool prior to the heating of said food; and means for supporting said individual receptacles adjacent to said drawer within said housing.

22. A portable cooling and heating device for cooling and heating foods placed therein comprising;

a housing having a bottom wall, a front wall, a rear wall and side walls;

a top wall hingedly connected to one of said walls including a first section and a second section hingedly connected to one another, with said first section covering a top of said housing and said second section covering one of said walls and an opening in said one of said walls when said top wall is in a closed condition;

a cooling means for cooling an interior of said housing;

a heating means for heating said interior of said housing; and a means for accommodating both said cooling means and said heating means;

wherein said means for accommodating both said cooling means and said heating means is slidable into and out of said opening formed in said housing.

23. The device as defined in claim 22, wherein at least said first section includes a smooth inner surface for forming a tabletop when said top wall is in an open condition.

24. The device as claimed in claim 23, wherein said second section supports said first section in an essentially horizontal position when said top wall is in said open condition.

25. The device as defined in claim 22, wherein at least one of said sections includes a handle hingedly connected to an outer surface thereof.

* * * * *